United States Patent
Cortes Gomez et al.

(10) Patent No.: US 9,871,703 B2
(45) Date of Patent: Jan. 16, 2018

(54) DATA PLANE DISTRIBUTION OF CONTROL MESSAGES

(71) Applicant: Telefonaktiebolaget L M Ericsson (publ), Stockholm (SE)

(72) Inventors: Francisco Cortes Gomez, The Hague (NL); Jan Scheurich, Aachen (DE)

(73) Assignee: TELEFONAKTIEBOLAGET L M ERCISSON (PUBL), Stockholm (SE)

( * ) Notice: Subject to any disclaimer, the term of this patent is extended or adjusted under 35 U.S.C. 154(b) by 84 days.

(21) Appl. No.: 14/778,827

(22) PCT Filed: Mar. 26, 2013

(86) PCT No.: PCT/EP2013/056373
§ 371 (c)(1),
(2) Date: Sep. 21, 2015

(87) PCT Pub. No.: WO2014/154248
PCT Pub. Date: Oct. 2, 2014

(65) Prior Publication Data
US 2016/0050122 A1    Feb. 18, 2016

(51) Int. Cl.
H04L 29/00 (2006.01)
H04L 12/24 (2006.01)
H04L 12/721 (2013.01)
H04L 12/751 (2013.01)
H04L 29/06 (2006.01)

(52) U.S. Cl.
CPC .............. *H04L 41/28* (2013.01); *H04L 45/02* (2013.01); *H04L 45/566* (2013.01); *H04L 45/72* (2013.01); *H04L 63/0435* (2013.01)

(58) Field of Classification Search
None
See application file for complete search history.

(56) References Cited

U.S. PATENT DOCUMENTS

| | | | |
|---|---|---|---|
| 7,113,487 B1 | 9/2006 | Johnson et al. | |
| 7,693,090 B1 | 4/2010 | Kimpe | |
| 7,962,656 B1 | 6/2011 | Ang et al. | |
| 8,787,388 B1 * | 7/2014 | Adams | H04L 45/38 370/244 |
| 8,792,374 B1 * | 7/2014 | Jain | H04L 47/10 370/252 |

(Continued)

OTHER PUBLICATIONS

International Search Report, Application No. PCT/EP2013/056373, dated Feb. 20, 2014.

(Continued)

*Primary Examiner* — Madhuri Herzog
(74) *Attorney, Agent, or Firm* — Sage Patent Group

(57) ABSTRACT

Techniques of executing commands in forwarding nodes are discussed. Control messages are recursively included within each other and distributed in a data plane formed by a network of the forwarding nodes. A given control message can include a command which is executed by a respective forwarding node. The given control message further includes a further control message to be sent to a further forwarding node by the respective forwarding node. The control messages are created by a control node which is configured for controlling operation of the network of forwarding nodes.

26 Claims, 9 Drawing Sheets

(56) References Cited

U.S. PATENT DOCUMENTS

| | | | |
|---|---|---|---|
| 9,042,402 B1* | 5/2015 | Loganathan | H04L 12/4641 |
| | | | 370/230 |
| 2006/0117367 A1* | 6/2006 | Lyle | H04L 12/18 |
| | | | 725/114 |
| 2014/0211661 A1* | 7/2014 | Gorkemli | H04L 41/12 |
| | | | 370/255 |

OTHER PUBLICATIONS

Written Opinion of the International Searching Authority, Application No. PCT/EP2013/056373, dated Feb. 20, 2014.
Open Networking Foundation, "OpenFlow Switch Specification", Version 1.3.1 (Wire Protocol 0x04), Sep. 6, 2012, 128 pp.

\* cited by examiner

Command Type: <instert_rule, delete_rule, send_packet, echo_req, register_event, ...>

Parameters: < complete rule: { match, actions, instructions, counters, ... },
            partial rule: { match mask, tad mask },
            event_type: { ...},
            ... >

DATA PLANE DISTRIBUTION OF CONTROL MESSAGES

CROSS REFERENCE TO RELATED APPLICATION

This application is a 35 U.S.C. §371 national stage application of PCT International Application No. PCT/EP2013/056373, filed on Mar. 26, 2013, the disclosure and content of which is incorporated by reference herein in its entirety. The above-referenced PCT International Application was published in the English language as International Publication No. WO 2014/154248 A1 on Oct. 2, 2014.

TECHNICAL FIELD

Techniques of executing commands in forwarding elements of a network of forwarding elements are described. In particular, techniques are described where a first control message including a command to be executed by a particular forwarding element further includes a second control message for a further forwarding element.

BACKGROUND

In data communication, forwarding of data packets is typically provided by a network of forwarding nodes. Implementations exist where the forwarding nodes have a larger or smaller degree of decision logic on how to forward the data packets; implementations vary between full or almost complete autonomous control of said forwarding, e.g., in versions of the Internet Protocol (IP) based networks according to the Internet Engineering Task Force (IETF) standards or the Ethernet based networks according to the Institute of Electrical and Electronics Engineers (IEEE) 802 standard—and no or only little autonomous control of said forwarding, e.g., in implementations where a data plane constituted by the forwarding elements is separated from a control plane where the decision logic resides. Latter scenarios are sometimes referred to as a Software Defined Network (SDN). Here a forwarding node may operate based on a set of forwarding rules which typically are implemented by execution of commands which are provided by a control node of the control plane controlling operation of the network of forwarding nodes, e.g., in a centralized and concentrated manner.

Sometimes forwarding nodes having a comparably large degree of autonomous control of said forwarding are referred to as routers or switches; while forwarding nodes having only a comparably small degree of autonomous control of said forwarding are referred to as data path nodes.

In any such implementation, situations are known where it is desired to execute commands in a plurality of forwarding nodes. Such commands may have various purposes, e.g., implementation of new forwarding rules as mentioned above, but also general traffic engineering operations, read and/or write operations regarding operation properties of the forwarding nodes, aggregation of operational statistics, etc.

In conventional techniques, a central unit, e.g., the control node, communicates with each one of the plurality of forwarding nodes to prompt execution of the respective command. Such a communication is typically established using dedicated control channel communication including a respective protocol and possibly dedicated data links between the forwarding nodes and the central unit. Such a scenario has certain limitations. For example, size and complexity of typical networks of forwarding nodes are steadily increasing and this trend is predicted to continue. Then the work load of the central unit may be heavy as the number of operational steps to prompt execution of commands in all forwarding nodes may be very large. Further, the network may be congested by a high amount of control messages which include the commands. All this may slow down or even inhibit the operation of the network of forwarding nodes as is shown below for a particular scenario which exemplarily illustrates limitations of such conventional techniques.

In networks of forwarding nodes, data packets in the data plane typically traverse a plurality of forwarding nodes between an ingress forwarding node, e.g., where the data packets first enters the network of forwarding nodes, and an egress forwarding node, e.g., where the data packet leaves the network of forwarding nodes. Each forwarding node of the plurality of forwarding nodes may forward a data packet based on the forwarding rules along dedicated data links of the data plane. Scenarios are known where these forwarding rules need to be modified in a live network, i.e., in a situation where data packets keep arriving during the modification process. A coordinated executing of the respective commands implementing new or modified forwarding rules at each forwarding node of the plurality of forwarding nodes is typically required in order to avoid forwarding loops, lost data packets, etc. (forwarding failures). Strategies for reducing forwarding failures are known, e.g., implementing a strict sequence of said executing of the respective commands by communicating with each forwarding node one after another in a predetermined order, a time to live, as described e.g. in IETF Request for Comments (RFC) 791 of September 1981, section 1.4, or a split-horizon, as described e.g. in IETF RFC 2453 of November 1998, section 3.4.3, in the Ethernet or IP based networks, or pre-provisioning of alternative forwarding rules. In a simple scenario, the implementing of new forwarding rules may be executed sequentially starting at the egress forwarding node and progressing step-by-step towards the ingress forwarding node along the so-called forwarding path to avoid forwarding failures.

Some techniques of reducing forwarding failures are based on enforcing the order in which a set of forwarding nodes executes a set of commands prompting modifications related to a specific type of data packets. Typical types of data packets may be: all packets with a common destination, all data packets with a common combination of source and destination, all data packets of a specific protocol type, etc. In a communication network of significant size, at any given point of time there are typically modifications on-going for a very large amount of different types of packets. Such techniques, sometimes referred to as network control techniques, typically aim at largely or fully independent control of modifications related to different types of data packets. They often rely on controlling the behaviour of single forwarding nodes and on getting feedback from each node in order to enforce dependencies between different nodes.

Yet, such strategies of reducing forwarding failures face certain restrictions. For example, they may require a set of complex rules which need to be obeyed in any one of the plurality of forwarding nodes. This may increase the system complexity and maintenance efforts. Further, their applicability to SDNs may be strongly restricted. In general, due to the high degree of complexity of such known strategies, operational reliability or redundancy of the system may be reduced; for example, a single operational error of a forwarding node may cause forwarding failures. Similar restrictions may apply to other types of commands.

Furthermore, when individual forwarding nodes are controlled and feedback is obtained from each individual forwarding node, this may result in unintentional inter-dependencies between various sets of commands which are inherently independent. For example, modifications related to a given type of data packets may unnecessarily impact the inherently independent modifications related to other types of data packets, e.g., due to a plurality of commands for different types of data packets pending for execution at a forwarding node and/or congesting the control channel, etc. This may cause inefficiencies such as longer setup times, higher processing load, and idle processing units waiting for permission to continue execution.

Therefore, a need exist to provide advanced techniques for executing commands in a plurality of forwarding nodes. In particular, a need exists to proved techniques which allow for fast execution and/or reliable execution and/or efficient execution of the commands. A need exists to provide techniques which reduce inter-dependencies between different sets of commands.

SUMMARY

This need is met by the features of the independent claims. The dependent claims define embodiments.

According to an aspect, a method of executing commands in a plurality of forwarding nodes of a network of forwarding nodes is provided. The method comprises a first forwarding node of the plurality of forwarding nodes receiving a first control message from a further forwarding node. The first control message includes at least: at least one command to be executed by the first forwarding node; and a second control message for a second forwarding node of the plurality of forwarding nodes; and forwarding instructions to the second forwarding node to which the second control message is to be sent by the first forwarding node. The method further comprises the first forwarding node executing the at least one command. The method further comprises the first forwarding node sending the second control message to the second forwarding node based on the forwarding instructions. The second control message includes at least one command to be executed by the second forwarding node.

According to a further aspect, a forwarding node of a network of forwarding nodes is provided. The forwarding node comprises and interface and a processor. The interface is configured for receiving a first control message from a further forwarding node. The first control message includes at least: at least one command to be executed by the forwarding node; and a second control message for a second forwarding node; and forwarding instructions to the second forwarding node to which the second control message is to be sent by the forwarding node. The at least one processor is configured for executing the at least one command. The interface is further configured for sending the second control message to the second forwarding node based on the forwarding instructions. The second control message includes at least one command to be executed by the second forwarding node.

According to a further aspect, a method of prompting an execution of commands in at least some of a plurality of forwarding nodes of a network of forwarding nodes is provided. The method comprises a control node, which is configured for controlling operation of the network of forwarding nodes, creating a set of control messages such that the set of control messages is recursively included within at least one root control message of the set of control messages. Any one of the set of control messages which is for a respective first forwarding node includes at least: a second control message of the set of control messages for a respective second forwarding node; forwarding instructions to the second forwarding node to which the second control message is to be sent by the respective first forwarding node. At least some of the set of control messages include at least one command to be executed by the respective first forwarding node. The method further comprises the control node sending the at least one root control message to the network of forwarding nodes to prompt the execution of the commands.

According to a further aspect, a control node configured for controlling operation of a network of forwarding nodes is provided. The control node comprises at least one processor and an interface. The at least one processor is configured for creating a set of control messages such that the set of control messages is recursively included within at least one root control message of the set of control messages. Any one of the set of control messages which is for a respective first forwarding node includes at least a second control message of the set of control messages for a respective second forwarding node; and forwarding instructions to the respective second forwarding node to which the second control message is to be sent by the respective first forwarding node. At least some of the set of control messages include at least one command to be executed by the respective first forwarding node. The interface is configured for sending the at least one root control message to the network of forwarding nodes to prompt execution of the commands.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION

Figure 1:
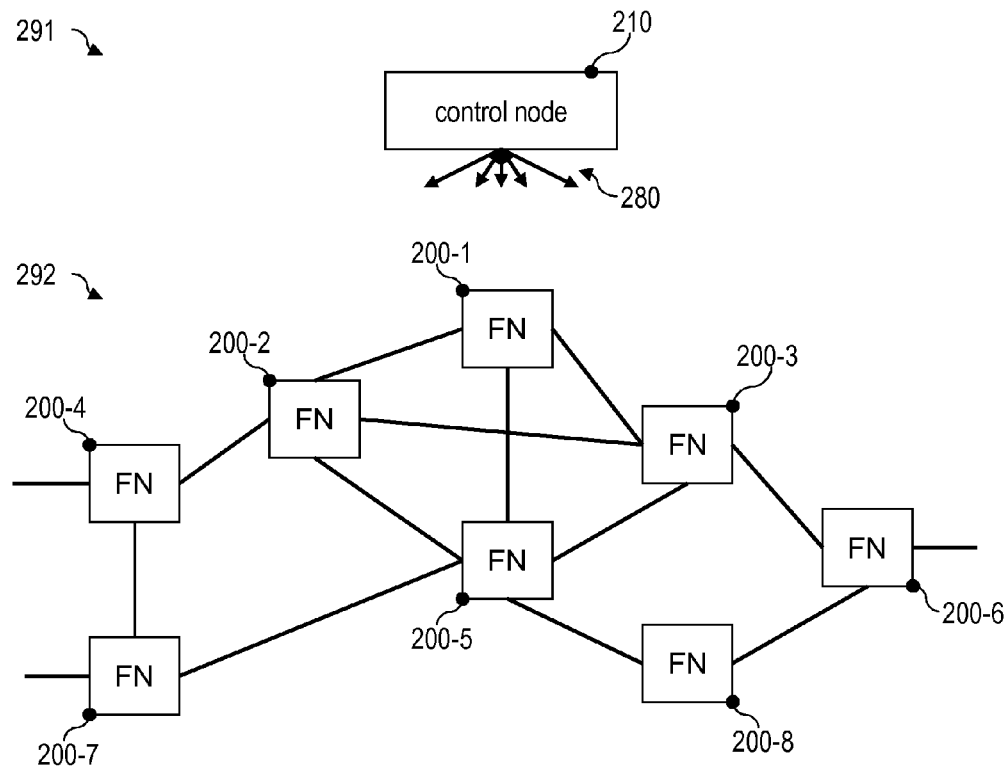
FIG. 1 illustrates a network of forwarding nodes and a control node configured for controlling operation of the network of forwarding nodes.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are discussed which enable to execute commands in a plurality of forwarding nodes of a network of forwarding nodes. Examples of forwarding nodes are the above-referenced router, switches, and data plane nodes of a SDN architecture. Albeit hereinafter reference is made predominantly to the SDN architecture with separated control plane and data plane, the scope of the invention is not limited to this scenario. Respective techniques and scenarios may be readily applied to a network with more autonomous forwarding nodes, e.g., in the IP or Ethernet environment.

The type of command is not particularly limited. For example, commands may relate to read and/or write operations regarding operation properties of the forwarding nodes, aggregation of operational statistics, changing of settings of a forwarding element, changing between operational modes of a forwarding element, etc. For example, the command may invoke operational statistics. It is also possible that the command sets forwarding properties, e.g., latency, priority, and/or an acknowledgement scheme at a respective forwarding node. One particular example referred to hereinafter are commands which configure a forwarding path for a delivery of data packets along a plurality of forwarding nodes. Configuring a forwarding path can relate to changing properties of the forwarding path and/or implementing a new version of the forwarding path. The forwarding path may refer to a directed graph of all forwarding nodes involved in the delivery of data packets belonging to a well-defined set of data traffic or data flow, e.g., from a certain originator and/or to a certain recipient. In a simple scenario, the forwarding path may be the set of forwarding nodes between a single ingress forwarding node and a single egress forwarding node. In another scenario, the forwarding path may be a branched tree representing the transport from multiple ingress forwarding nodes to a single egress forwarding nodes. In yet further scenarios, the forwarding path may connect a single ingress forwarding node with a plurality of egress forwarding nodes; latter case may find application in so-called anycast and load-balancing use cases. In general and in other words, the forwarding path may have branches.

For example, the commands may implement a new version of the forwarding path, the new version replacing a current version of the forwarding path. Such an application is typically sensitive to forwarding failures. In such a scenario, the techniques may reduce or avoid forwarding failures—even when the commands are executed on a live network of forwarding nodes, i.e., with incoming data packets.

This may be achieved by recursively including control messages including the respective commands within each other. In other words, the control messages are nested or encapsulated within each other. E.g., a given control message may be included, respectively contained, within a further control message. By such means, it is possible to ensure an order and sequence of said executing the command. For example, before a given control message which is recursively included in another control message is received by the respective forwarding node, the another control message is necessarily received by another respective control node which can the execute the respective command of the another control message earlier. Generally speaking, the recursive including may prompt said executing of commands sequentially along a partially ordered set of the forwarding nodes. If in the partially ordered set a first forwarding node precedes (succeeds) a second forwarding node, the control message of the first forwarding node contains (is included in) the control message of the second forwarding node. Executing the commands in a well-defined order and sequence along the partially ordered set of forwarding nodes may fully or partly avoid forwarding failures.

While such techniques of recursively including the control messages within each other may find particular application for said implementing of the new version of the forwarding path, these techniques may be readily applied for other use cases, e.g. where an order and sequence of said executing of the commands may yield similar or further effects.

It is then possible to distribute and forward the recursively included control messages using data links of the data plane—rather than control channel communication with the control plane. In other words, once the recursively included control messages have been provisioned by the control plane to the data plane, the data plane may distribute and execute the control messages and the included commands autonomously. Such data plane distribution of the control messages may significantly reduce the work load imposed on the control plane. It may further facilitate parallelization of execution of various independent set of commands: once triggered, it may commence autonomously.

In FIG. 1, a network 292 of forwarding nodes (FNs) 200-1-200-8 is illustrated for a SDN architecture. The SDN architecture enables a separation of the control plane 291 from the data plane corresponding to the FN network 292, sometimes also referred to as split router architecture. Typically, in such SDN architectures independent control instances are implemented such as the control node (CN) 210. Example implementations of such a SDN architecture are the OpenFlow Protocol of the Open Networking Foundation Open Flow Switch Specification version 1.3.1, and the ForCES of the IETF RFC 6053 of November 2010. In FIG. 1, the full lines denote the data links between the various FNs 200-1-200-8. In general, the data links between the FNs 200-1-200-8 of the data plane may employ a different protocol as the control channel 280 between the control node 210 and the FNs 200-1-200-8; also they may employ different physical connections.

Figure 2A:
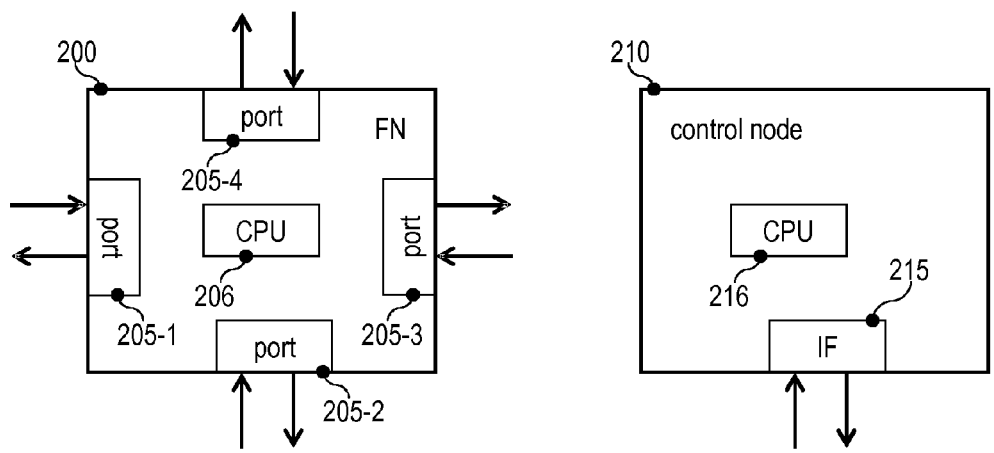
FIG. 2A illustrates one of the forwarding nodes in greater detail.

In FIG. 2A, a FN 200 is shown with greater detail. The FN 200 comprises a number of four ports 205-1-205-4 which form an interface. Each port may send and/or receive data packets along data links. The FN 200 further comprises a processor 206, e.g., a multi-core processor. The FN 200 may comprise a dedicated port for communication with the control node 210 using the control channel 280; yet, it is possible to employ the ports 205-1-205-4 in various scenarios for such purposes.

Figure 2B:
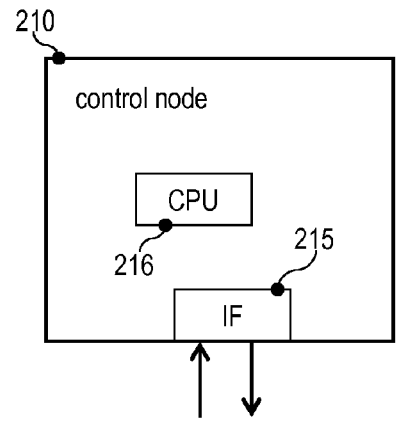
FIG. 2B illustrates the control node in greater detail.

In FIG. 2B, the CN 210 is shown in greater detail. The CN 210 comprises a processor 216, e.g., a multi-core processor. Further, the CN 210 comprises an interface 215 which enables communication with the FNs 200, 200-1-200-8 of the FN network 292 (cf. FIG. 1). Via the interface 215, the CN 210 sends control messages to the FNs 200, 200-1-200-8 employing the control channel.

Figure 3:
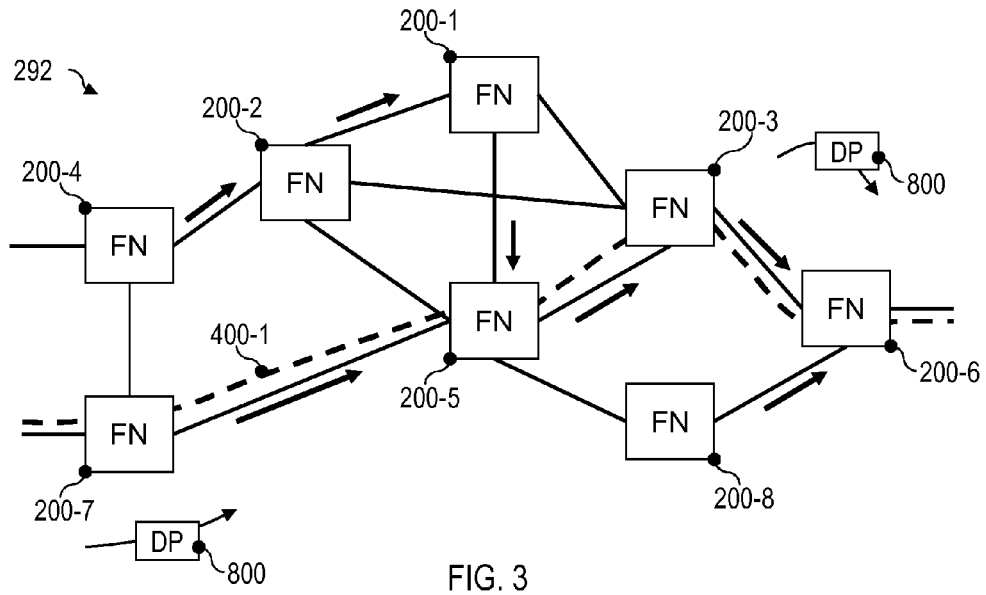
FIG. 3 illustrates a forwarding path through the network of forwarding nodes.

In FIG. 3, a forwarding path 400-1 is illustrated (dashed line). Data packets 800 (labelled DP in FIG. 3) are forwarded along the forwarding path 400-1 between the ingress FN 200-7 and the egress FN 200-6. The data packets 800 may be specified with respect to a certain originator or recipient (both not shown in FIG. 3); sometimes such a set of data packets 800 is referred to as a data flow. With respect to the data flow, e.g., FN 200-3 is located upstream of FN 200-6 because data packets traverse FN 200-3 before they traverse FN 200-5.

In FIG. 3, the arrows illustrate forwarding rules in effect for such a flow of data packets 800. Typically the forwarding rules specify the flow of data packets 800 by means of elements selected from the group comprising: originator Media Access Control (MAC) address, recipient MAC address, originator IP address, recipient IP address, etc. The particular action to be performed when a data packet 800 belonging to a respectively identified flow arrives may be forwarding the data packet 800 to a particular port 205-1-205-4 of the respective FN 200-1-200-8. Sometimes, a set of forwarding rules for destination based forwarding scenarios, e.g., generated using a shortest-path-tree algorithm, are used to collectively forward all traffic towards the same egress forwarding node.

Figure 4:
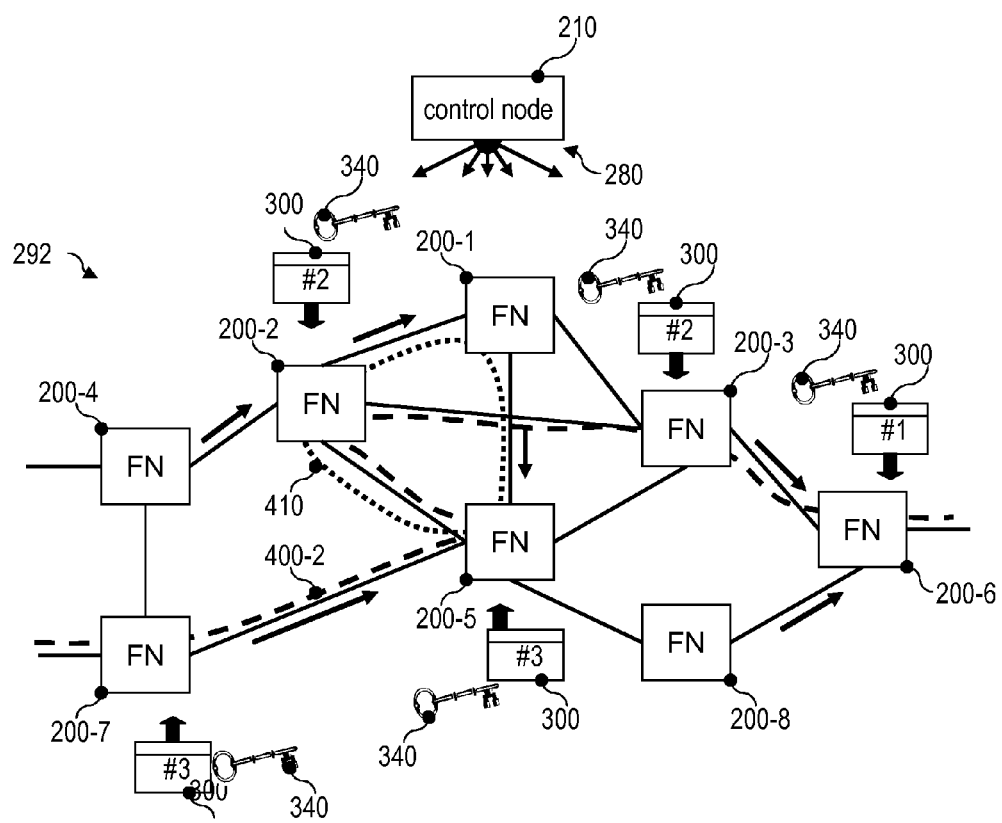
FIG. 4 illustrates a new version of the forwarding path of FIG. 3 and further illustrates a loop due to a forwarding failure.

Turning to FIG. 4, a new version of the forwarding path 400-2 is illustrated (dashed line). Implementation of the new forwarding path 400-2 may be motivated by traffic engineering purposes, e.g., to reduce the traffic load on the data link between FNs 200-5 and 200-3. If the respective command implementing the new forwarding path 400-2 is executed at the FN 200-5 before it is executed at the FN 200-2, then due to the forwarding rules a loop 410 is created with a data packet 800 circling around FNs 200-5 to 200-2 to 200-1 to 200-5 and so on. This may proceed until FN 200-2 executes the respective command implementing the new forwarding path 400-2. Sometimes the loop 410 may even prevail longer, e.g., if the loop 410 causes an overload situation, e.g., at FN 200-2, which may delay said executing of the command. In such a scenario and in similar scenarios, data packets 800 may be delayed and/or lost and/or dropped due to time-out etc. Forwarding failures occur.

SDN architectures which are based on moving at least one portion of the control logic of FNs 200, 200-1-200-8 to a common control instance, in general present the potential of enhancing forwarding failure avoidance during traffic engineering operations by having the common control instance.

In this respect, the basic mechanism available to OpenFlow according to various reference implementations is the usage of Barrier messages OFPT_BARRIER_REQUEST and OFPT_ BARRIER_ REPLY as defined in the Open Flow Switch Specification, Version 1.3.1, section A.3.8. They may typically result in a long lead-time to finalize the implementation of a new forwarding path 400-1, 400-2. Additionally they may potentially delay subsequent traffic engineering operations for other forwarding paths. Further, if a certain order or sequential execution of said implementing of the new forwarding is needed, a respective CN 210 typically needs to prompt said executing by sending the Barrier message for each FN 200, 200-1-200-8 in this sequence. The CN 210 may need to keep track of the replies of the FNs 200, 200-1-200-8 and may delay further actions until the respective prior replies have been received via the control channel 280. This may occupy considerable resources of the CN 210 over an extended period of time. Said implementing may be slowed down. The computational burden imposed on the CN 210 further increases if a plurality of forwarding paths is implemented at least partially parallel.

Another reference implementation is the Resource reSerVation Protocol (RSVP) according to the IETF RFC 2205 and IETF RFC 4875 standard. According to the RSVP, so-called Path messages are sent from an ingress FN along a chosen ordered set of intermediate FNs to an egress FN. The egress FN then sends a so-called Reservation message back along the same set of FNs, but in opposite order. The reception and processing of the Reservation messages results in implementation of the forwarding path on the corresponding FNs. An ordered execution of the commands is typically provided so that forwarding failures may be avoided. A corresponding application of the RSVP is typically restricted to Multiprotocol Label Switching (MPLS) networks. Further, the two-way approach sending the Reservation message back and forth introduces significant delay in the execution of the commands due to the round trip time. Further, the usage of the RSVP for point-to-multipoint scenarios, i.e., a single ingress FN to a plurality of egress FNs with branches, present a number of additional limitations. Although means are provided for grouping Reservation messages in the way from ingress FN to the plurality of egress FNs, there is the need to encode the reverse path information in the Path messages towards the egress FNs to enable the forwarding of the resulting Reservation messages. Implementations of point to multipoint extensions for RSVP typically require a high degree of complexity.

Turning back to FIG. 4, below techniques are presented according to various embodiments of the invention which allow for a simple and fail-safe execution of the commands in the plurality of FNs 200, 200-1-200-8.

For this control messages 300 are provided to the FNs 200-6, 200-3, 200-2, 200-5, 200-7, i.e., at least to the FNs along the new forwarding path 400-2. Some or all of the control messages 300 include commands which are to executed by the respective FNs 200-6, 200-3, 200-2, 200-5, 200-7. The control messages 300 are provided to the FNs 200-6, 200-3, 200-2, 200-5, 200-7 in a certain order and sequence. First, the respective control message 300 is provided to the FN 200-6. Next, the respective control messages 300 are provided to the FNs 200-3, 200-2. Next, the respective control messages 300 are provided to the FNs 200-5, 200-7. Additionally, it is ensured that, before providing the control message to a subsequent FN, the previous FN executes the respectively included command. By such means it is possible to ensure that the new forwarding path 400-2 is implemented at the FN 200-2 before it is implemented at the FN 200-5. In other words and in general, by providing the control messages 300 in an ordered manner, e.g. along a partially ordered set of FNs 200, 200-1-200-8 forwarding failures may be avoided. It should be understood that in general a more differentiated approach is possible, where sending on of only some of the control messages 300 included in a further control message is delayed until after execution of the at least one command included in the further control message 300.

Such techniques as mentioned above are discussed in further detail below. Namely, to ensure such an ordered distribution of the control messages 300, various embodiments rely on two major concepts: firstly, recursively including of the control messages 300 within each other; and, secondly data plane distribution of the control messages 300. This first concept, i.e., recursively including of the control messages 300 is discussed below with reference to FIGS. 5A-5C.

Figure 5A:
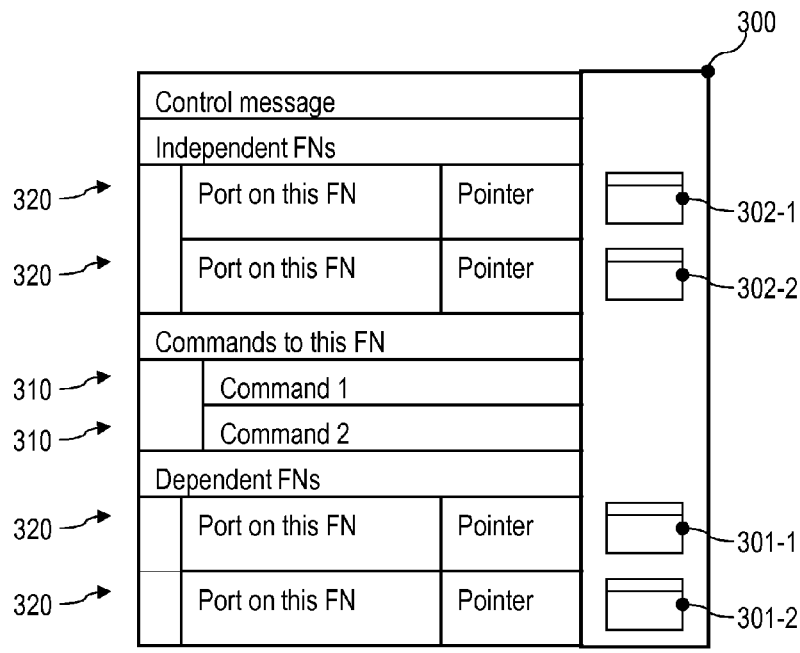
FIG. 5A illustrates a first control message including a command configuring the new version of the forwarding path at a first forwarding node of the network of forwarding nodes, and further including further control messages for further forwarding nodes.
Figure 5B:
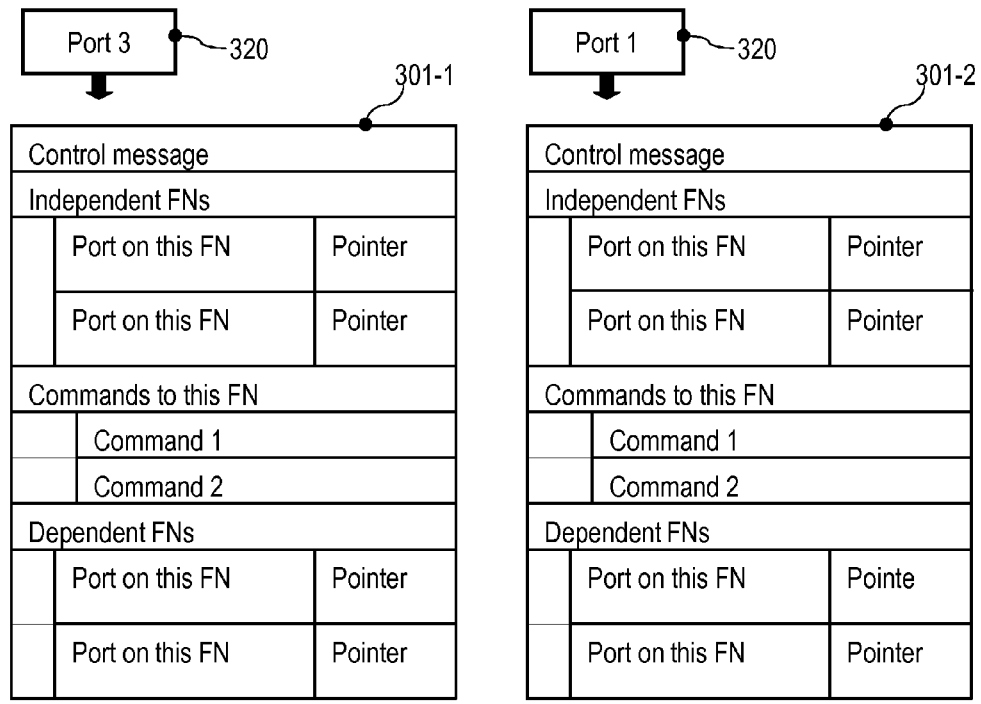
FIG. 5B illustrates two of the further control messages of FIG. 5A.
Figure 5C:
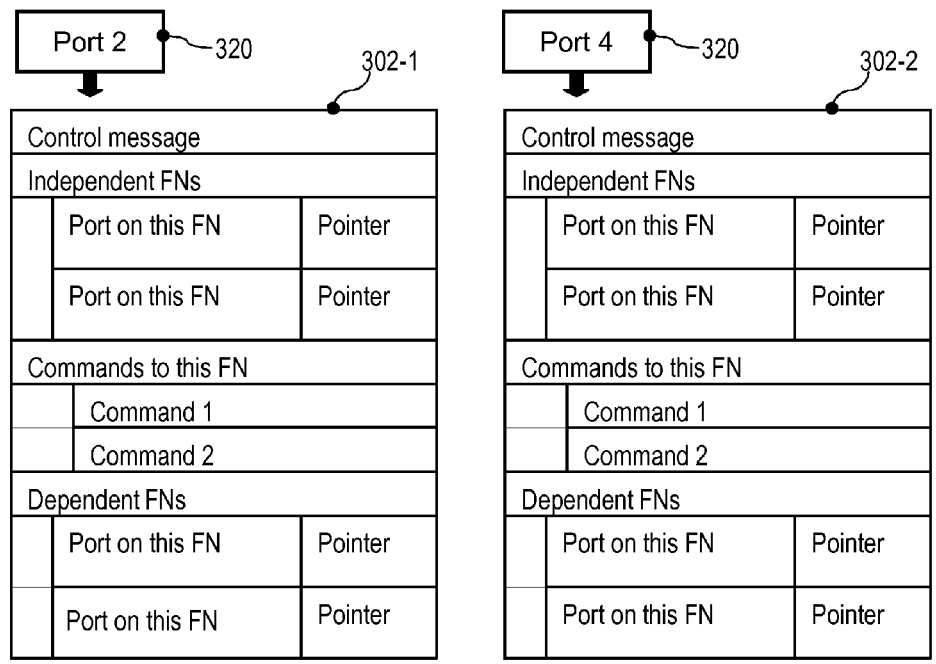
FIG. 5C illustrates two of the further control messages of FIG. 5A.

In FIG. 5A a control message 300 is shown, e.g., for the FN 200-2 of FIG. 4. The control message 300 includes two commands 310 to be executed by the respective FN 200-2. Further, this control message 300 includes, respectively contains, four further control messages 301-1, 301-2, 302-1, 302-2. For each one of these further control messages 301-1, 301-2, 302-1, 302-2, the control message 300 includes forwarding instructions 320 to a respective further FN to which the respective control message 301-1, 301-2, 302-1, 302-2 is to be sent by the FN 200-2.

The type and format of the forwarding instructions 320 is not particular limited; it may, in particular, depend on the communication protocols used for controlling the FNs 200, 200-1-200-8. For example, the forwarding instructions 320 can specify one of the ports 205-1-205-4 of the respective FN 200, 200-1-200-8 which is to be used for sending of the respective control message 300, 301-1, 301-2, 302-1, 302-2. It is also possible that the forwarding instructions 320 indicate a preset forwarding tunnel of the network 292 to be used for said sending of the respective control message 300, 301-1, 301-2, 302-1, 302-2. Such forwarding tunnel may be a logical connection implemented by a communication protocol providing characteristics such as encryption, reliable delivery of packets, or flow control. It is also possible that the forwarding instructions 320 specify the target FN 200, 200-1-200-8 to which the respective control message 300, 301-1, 301-2, 302-1, 302-2 is to be sent, e.g., by means of a transport address or the like.

Therefore, the control messages 301-1, 301-2, 302-1, 302-2 are recursively included, respectively nested or encapsulated, in the control message 300. For example, the control messages 301-1, 301-2, 302-1, 302-2 may be referred to as sub control messages of the control message 300. They may have a similar data format and data structure as the control message 300 (cf. FIGS. 5B and 5C vs. FIG. 5A). Each one of the control messages 301-1, 301-2, 302-1, 302-2 may include one or more further control messages (not shown in the FIGs.) with respective pointers to a payload location thereof.

When a given FN 200, 200-1-200-8 receives a control message 300, 301-1, 301-2, 302-1, 302-2, the given FN 200, 200-1-200-8 accesses the payload of the control message 300, 301-1, 301-2, 302-1, 302-2 where the sub control messages 300, 301-1, 301-2, 302-1, 302-2 are included. The given FN 200, 200-1-200-8 can then extract the one or more sub control messages 300, 301-1, 301-2, 302-1, 302-2 (partitioning action).

The FNs 200, 200-1-200-8 are configured to execute the at least one command 310 included in the respective control message 300, 301-1, 301-2, 302-1, 302-2 before sending on the sub control messages 300, 301-1, 301-2, 302-1, 302-2. For example, considering the above mentioned example where the control message 301-1 is for the FN 200-5 (cf. FIGS. 5A-5C), it is ensured that the FN 200-2 implements the new forwarding path 400-2 before the FN 200-5 does so. The forwarding failure in form of the loop 410 is avoided (cf. FIG. 4). In general, by performing said executing of the at least one command 310 before said sending on of the further control messages 301-1, 301-2, 302-1, 302-2, an ordered executing of the commands for the FNs 200-6, 200-3, 200-2, 200-5, 200-7 is ensured.

Yet, scenarios exist where the topology of the FNs 200-6, 200-3, 200-2, 200-5, 200-7 does not require delaying the sending of all or some of the sub control messages to subsequent FNs 200-6, 200-3, 200-2, 200-5, 200-7 until after execution of the commands 310. In this respect, it is possible to determine dependencies between various FNs 200-6, 200-3, 200-2, 200-5, 200-7, the dependencies relating to a required sequence of said implementing of the new forwarding path 400-2. It is possible that sets of respectively one or more FNs 200-6, 200-3, 200-2, 200-5, 200-7 exist which are independent with respect to each other and where forwarding errors do not occur or are less likely to occur if commands are not executed in a well-defined order. Due to this, in the above example, the FN 200-2 does not need to wait until execution of the commands 310 having completed when sending on the control messages 302-1, 302-2 (cf. FIG. 5C), e.g., to the FN 200-7. FN 200-2 and FN 200-7 are independent with respect to each other. In other words, sending the control messages 302-1, 302-2 may occur in any temporal order, i.e., before, meanwhile, or after, with respect to said executing of the at least one command 310. Not delaying said sending of the control messages to independent FNs may result in a reduced total time needed for executing all commands 310. For example, if in the above-mentioned example the FN 200-2 has a long queue of commands pending for execution this would unduly delay said sending of the control messages 302-1, 302-2 to the independent FNs. As can be seen from FIGS. 5A, 5B, 5C, independent and dependent sub control messages are respectively indicated in the respective control message 300, 301-1, 301,2, 302-1, 302-2.

With respect to such determining of dependencies of FNs 200, 200-1-200-8, a given FN can be referred to as a client FN of another supplier FN, i.e., being dependent on it, if the commands addressed to the supplier FN must be executed before those addressed to the client FN in order to avoid forwarding failures. A FN can be referred to as a direct client FN of a supplier FN if it is not a client FN of any other client FN of the supplier FN. Two FNs are independent if they do not have a common supplier FN.

The determining of dependent and independent FNs may be based on a topology of the FNs 200, 200-1-200-8, i.e., considering the data links, and/or the current and the new version of the forwarding path 400-1, 400-2. In general reference implementations of determining dependent and independent FNs when implementing a new forwarding path 400-2 are known such that there is no need to discuss further details here.

In the light of the above, there are scenarios where it is expedient to distribute control messages 300, 301-1, 301-2,

302-1, 302-2 for FNs 200, 200-1-200-8 which do not include any commands 310 to be executed by the respective FN 200, 200-1-200-8. Such control messages 300, 301-1, 301-2, 302-1, 302-2 may be used merely to branch out and/or forward control messages 300, 301-1, 301-2, 302-1, 302-2. Also, indirect communication between FNs 200, 200-1-200-8 not connected by a direct data link may be realized.

All such techniques can be referred to as the data plane distribution of the control messages 300, 301-1, 301-2, 302-1, 302-2 where the control messages 300, 301-1, 301-2, 302-1, 302-2 are sent from a first FN 200, 200-1-200-8 to a second FN 200, 200-1-200-8 relying on the data links of the network 292. The data plane distribution may be distinguished against conventional control of the FNs 200, 200-1-200-8 where, according to various reference implementations, the CN 210 communicates with each FN 200, 200-1-200-8 one-by-one via the control channel protocol 280.

Figure 5D:
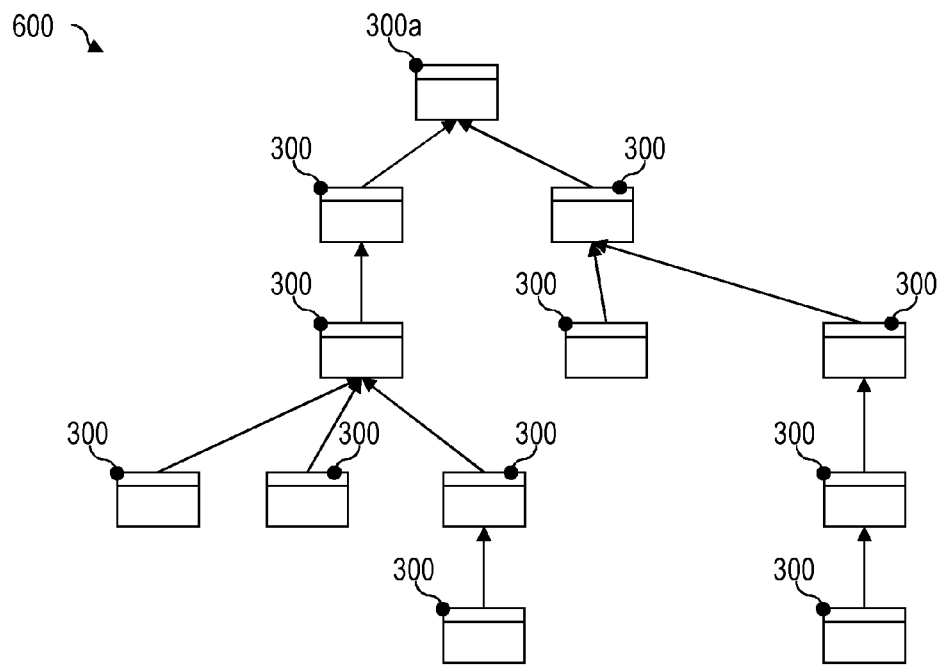
FIG. 5D illustrates a hierarchy of recursively included control messages.

Referring to FIG. 5D, the recursively including of the control messages 300, 301-1, 301-2, 302-1, 302-2 defines a hierarchy 600. For example, control messages 300, 301-1, 301-2, 302-1, 302-2 having the same level of hierarchy (in FIG. 5 aligned horizontally) may have the same number of intermediate control messages 300, 301-1, 301-2, 302-1, 302-2 in which they are included, e.g., with respect to a root control message 300a which is not included in any further control message 300, 301-1, 301-2, 302-1, 302-2. The root control message 300a may be highest in the hierarchy 600.

Figure 6:
FIG. 6 illustrates the command of FIG. 5A.

Turning to FIG. 6, a typical command 310 used for implementing new forwarding rules, thereby implementing the new forwarding path 400-2 are depicted. Various command types can be employed, such as implementing new forwarding rules or deleting a forwarding rule, etc. The various command types can be associated with parameters which specify the particular command to be executed.

As will be appreciated from the above, such techniques are compatible with the SDN paradigm where individual FNs 200, 200-1-200-8 do not have or only have limited knowledge about the topology of the network 292. In particular as opposed to various reference implementations, e.g., the RSVP, a given FN 200, 200-1-200-8 does not need to know how other FNs 200, 200-1-200-8 are connected to the network 292. It may even be expandable that a given FN 200, 200-1-200-8 has any knowledge about its own position in the network 292. Rather, the control messages 300, 301-1, 301-2, 302-1, 302-2 include all necessary information, at least in an implicit manner.

Above, the underlying concepts of, firstly, recursively included control messages 300, 301-1, 301-2, 302-1, 302-2 and, secondly, data plane distribution of the control messages 300, 301-1, 301-2, 302-1, 302-2 have been discussed. Various further scenarios are discussed below.

For example, it is possible to optionally take into account security issues. Then each one or a fraction of the control messages 300 can be encrypted. Making reference again to FIG. 4, each FN 200-6, 200-3, 200-2, 200-5, 200-7 has a cryptographic key 240 available to decode the respective control message 300 and, optionally, to authenticate the control message 300. In a simple scenario, is possible that the cryptographic key 340 is the same for all FNs 200-6, 200-3, 200-2, 200-5, 200-7, i.e., all control messages 300 can be encrypted based on the same cryptographic key 340. It is also possible that each FN 200-6, 200-3, 200-2, 200-5, 200-7 uses a different cryptographic key 340, i.e., each control message 300 is encrypted based on a different cryptographic key 340.

For example, the cryptographic key 340 can be obtained from a data security handshake of the respective FN 200, 200-1-200-8 with the CN 210, e.g., using the control channel 280. In such a scenario, if each control message 300, 301-1, 301-2, 302-1, 302-2 is encrypted based on a different cryptographic key 340, a given control message 300, 301-1, 301-2, 302-1, 302-2 can only be decrypted by the single respective FN 200, 200-1-200-8. For this respective single FN 200, 200-1-200-8 all further control messages 300, 301-1, 301-2, 302-1, 302-2 may be opaque and not possible to decrypt, i.e., inaccessible—even though they are included in the respective control message 300, 301-1, 301-2, 302-1, 302-2 for this respective single FN 200, 200-1-200-8.

Other possibilities of obtaining the cryptographic key 340 are pre-configuration or a negotiation with a third-party certificate node (not shown in the FIGs.), e.g., using the control channel 280.

For example, in various reference implementations of the OpenFlow protocol, security aspects are addressed by using Transport Layer Security (TLS) for the OpenFlow control channel 280 between the CN 210 and the FNs 200, 200-1-200-8. In various embodiments of the invention, alternative and supplementing mechanisms to achieve a comparable degree of security consider the data plane distribution of the control messages 300, 301-1, 301-2, 302-1, 302-2. Such communication channels are typically uni-directional from the CN 210 to the network 292 of FNs 200, 200-1-200-8. Any resulting communication from network 292 back to CN 210, e.g., for resilience purposes as discussed below, can employ the conventional OpenFlow control channel 280 over TLS.

In various scenarios, the CN 210 uses some of the parameters negotiated during the conventional TLS handshake, e.g., master secret, symmetric session keys, as well as the TLS certificates. In other words, leveraging the conventional TLS channel between the CN 210 and each FN 200, 200-1-200-8 is possible. The CN 210 can then achieve both authentication and encryption of the control messages 300, 301-1, 301-2, 302-1, 302-2 by encrypting and/or signing the set of control messages 300, 301-1, 301-2, 302-1, 302-2 to any given FN 200, 200-1-200-8 with the parameters specific for that FN 200, 200-1-200-8. A unique cryptographic key 340 is employed for each FN 200, 200-1-200-8. In the example depicted in FIGS. 5A, 5B, 5C, the control messages 300, 301-1, 301-2, 302-1, 302-2 for each specific FN 200, 200-1-200-8 would be encrypted and/or signed with a respective unique cryptographic key 340 belonging to the TLS Openflow control channel 280 between the CN 210 and that specific FN 200, 200-1-200-8. The cryptographic keys 340 could be used as in TLS according to reference implementations, by allowing some timely overlap between subsequent sessions of cryptographic keys 340, e.g., given that control messages 300, 301-1, 301-2, 302-1, 302-2 delivered via intermediate FNs 200, 200-1-200-8, i.e., employed the data plane distribution, may arrive after a session cryptographic key 340 change over the actual TLS connection.

It is also possible to use other parameters, e.g., if reduced security levels are acceptable. These include using public cryptographic keys 340 in the certificates, e.g., if the computational cost is acceptable, or using the master secret if a single cryptographic key 340 for the complete duration of the TLS session is acceptable.

In a further scenario relying on the OpenFlow protocol according to various reference implementations, the FNs 200, 200-1-200-8 establish TLS connections amongst them using the same cryptographic keys 340 used for the OpenFlow channel. This can simplify the handling at the cost of additional TLS connections and the risk that compromising one single FN 200, 200-1-200-8 compromises the whole network 292.

In various further scenarios it is possible to employ multicast cryptographic key 340 exchange protocols, e.g., according to the IETF RFC 1949 of May 1996. Such multicast protocols typically avoid the need and the cost of the negotiating independently with each client, here the FNs 200, 200-1-200-8. They often result from the requirement for a common cryptographic key 340 so that all clients can decrypt all messages sent by the server, here the CN 210.

Above, various scenarios have been discussed which address security aspects. Below, further scenarios are discussed which relate to reliability aspects, i.e., robustness against malfunctioning of the techniques.

For example, it is possible that a FN 200, 200-1-200-8 sends a result message to the CN 210 in response to said executing of the at least one command 310, e.g., via the control channel 280. For example, the result message can be employed as part of an acknowledgement scheme using positive and/or negative acknowledgements. The result message can include an indicator indicating success or failure of said executing, e.g., as a Boolean value or with a more detailed description of intermediate levels of success and failure; it is also possible that the indicator is included implicitly, e.g., due to the type of the result message as such. Alternatively or additionally the result message can include a reply prompted by said executing of the at least command 310. For example, the reply may include a result of said executing of the command, i.e., the result of an application triggered by said command and so forth. Alternatively or additionally, the result message can include an identification key uniquely identifying said executing of the at least command 310. For example, the identification key can be included in the respective control message 300, 301-1, 301-2, 302-1, 302-2 or can be derived from the control message 300, 301-1, 301-2, 302-1, 302-2, e.g., from a sequence number and/or a checksum thereof. For example, the identification key may further include a time stamp or the like. The identification key can be referred to as a transaction identifier. Alternatively or additionally, the result message can include data obtained in response to said executing of the at least one command 310. For example, the command 310 can invoke data stored on the respective FN 200, 200-1-200-8 which is then sent to the CN 210. For example, the data may correspond to operational statistics of the respective FN 200, 200-1-200-8 or may relate to forwarding rules currently implemented on the respective FN 200, 200-1-200-8. Alternatively or additionally, the result message can include at least one further identification key uniquely identifying executing of at least one further command on at least one further FN 200, 200-1-200-8, e.g., a preceding FN 200, 200-1-200-8. By such means, it may be possible to cluster result messages to the CN 210 from the network 292 of FNs 200, 200-1-200-8. This may reduce the work load imposed on the CN 210 and may reduce the control channel 280 load.

A similar result message can be sent alternatively or additionally in response to sending of (sub) control messages 300, 301-1, 301-2, 302-1, 302-2 by a FN 200, 200-1-200-8. By such means it may be possible to acknowledge successful sending and optionally, at least implicitly, successful executing of the at least one command 310.

In a simple scenario, every FN 200, 200-1-200-8 sends a result message to the CN 210. Yet this is expendable. For example, only some FNs 200, 200-1-200-8 can be configured to send a result message, e.g., based on one predefined rules or policies of the network 292. It is also possible that the control message 300, 301-1, 301-2, 302-1, 302-2 includes request indicators, e.g., a single Boolean flag or more complex data structures or an implicit indicator which is encoded into the format of the control message 300, 301-1, 301-2, 302-1, 302-2 itself, which request the result message. For example, the request indicators may be implicitly given from a sequence number of the control messages 300, 301-1, 301-2, 302-1, 302-2 and general policies. Then the sending of the result message can be selectively performed by the respective FN 200, 200-1-200-8, depending on the request indicators. The control node 210 can control the sending of the result message by employing the request indicators.

It is also possible that a particular FN 200, 200-1-200-8 includes such information as discussed above, e.g., the indicators indicating success or failure of said executing or the identification key or data obtained in response to said executing, in control messages 300, 301-1, 301-2, 302-1, 302-2 sent to further FNs 200, 200-1-200-8, i.e., sub control messages 300, 301-1, 301-2, 302-1, 302-2 obtained from a partitioning action. To this respect, the respective FN 200, 200-1-200-8 can add information to the sub control message 300, 301-1, 301-2, 302-1, 302-2. E.g., after the portioning action, the respective FN 200, 200-1-200-8 adds such additional data to the sub control message 300, 301-1, 301-2, 302-1, 302-2 before sending it on. In this respect, it may be possible that the respective FN 200, 200-1-200-8 modifies or adds header information to the sub control message 300, 301-1, 301-2, 302-1, 302-2 to take into account the modified sub control message 300, 301-1, 301-2, 302-1, 302-2.

In various reference implementations of the OpenFlow protocol where the CN 210 controls FNs 200, 200-1-200-8 directly using a persistent communication channel, i.e., employing the Barrier messages, the CN 210 is eventually informed if a command has been successfully executed by a respective FN 200, 200-1-200-8 or if a FN 200, 200-1-200-8 has experienced a failure. In order to handle reliability issues according to various embodiments it is possible that each executing of a command, e.g., implementing the new forwarding path 400-2, includes the unique identification key that is added to any sub control message 300, 301-1, 301-2, 302-1, 302-2 obtained from the respective partitioning action. This identification key can be used for individual acknowledgements.

In order to handle malformed control messages 300, 301-1, 301-2, 302-1, 302-2 or the inability to execute a received command 310, a FN 200, 200-1-200-8 can inform the CN 210 over the conventional Openflow control channel 280 of the failure including respective identifiers.

In order to avoid losing a control message 300, 301-1, 301-2, 302-1, 302-2 without noticing, different scenarios are possible. Some scenarios are described below. In a first scenario, executing of a command 310 includes a unique identification key, respectively transaction identifier, that is copied to any sub control message 300, 301-1, 301-2, 302-1, 302-2 obtained by a partitioning action. Each FN 200, 200-1-200-8 executing a command sends a result message to the CN 210 including this identification key as an indication that the command has been executed. For example, the CN 210 may use this result message as part of an acknowledgement scheme. The CN 210 sets a timer and a prepares list of FNs 200, 200-1-200-8 from which confirmations are expected. If the timer expires, respectively a monitored time stamp is exceeded, and confirmations are still outstanding, it can be assumed which FNs 200, 200-1-200-8 did not receive it. To this respect, the CN 210 may determine at least some of the FNs 200, 200-1-200-8 for which the result message is requested and respectively include request indicators in the corresponding control message 300, 301-1, 301-2, 302-1, 302-2.

It is also possible that the result message is only sent from such FNs 200, 200-1-200-8 which are lowest in the hierarchy, e.g., for each branch, i.e., where the respective control message 300, 301-1, 301-2, 302-1, 302-2 does not include any sub control messages 300, 301-1, 301-2, 302-1, 302-2.

It is also possible to group or cluster result messages for a plurality of executed commands 310 and send a combined result message to the CN 210 including respective information for all command executions.

Figure 7:
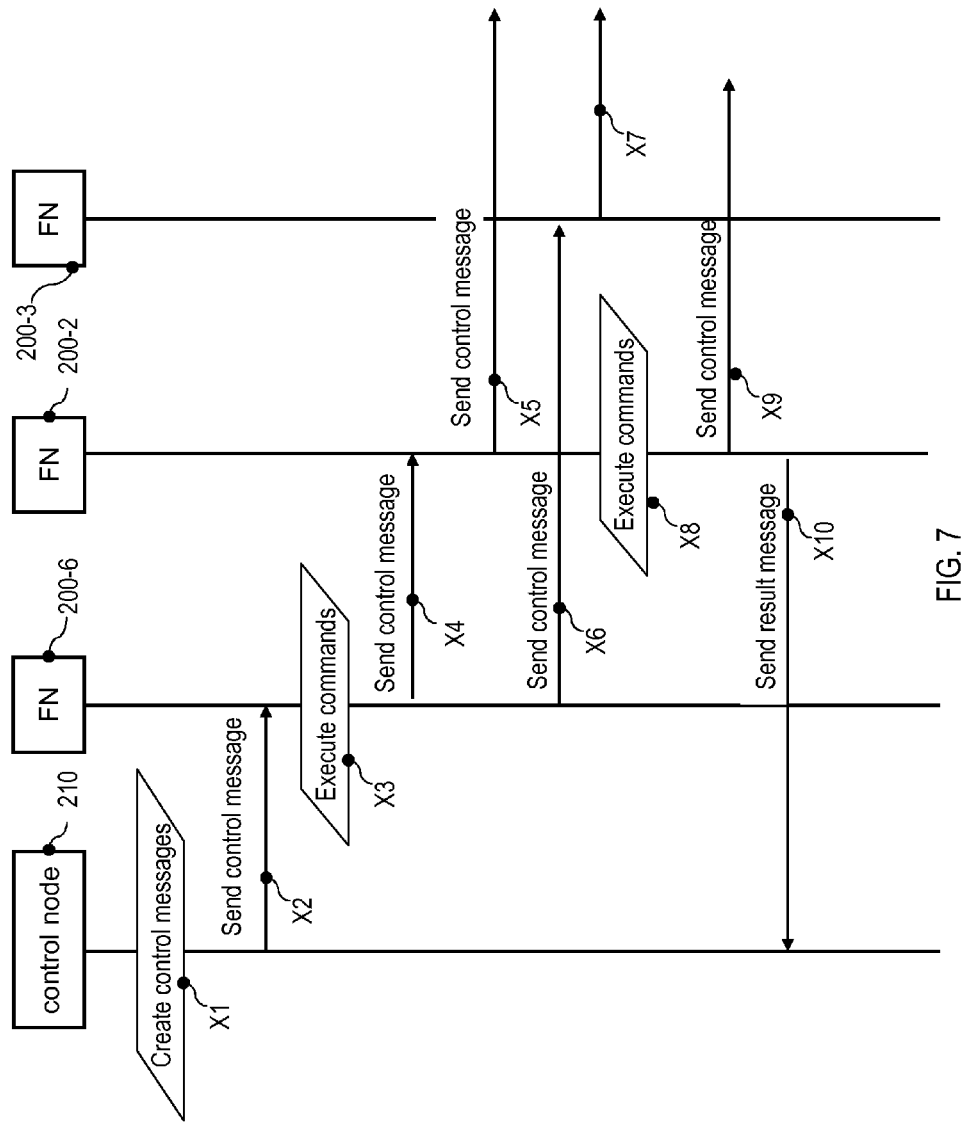
FIG. 7 is a signalling diagram of techniques enabling execution of commands according to various embodiments of the present invention.

In FIG. 7, a signalling diagram of techniques of executing commands on the FNs 200, 200-1-200-8 according to various embodiments is depicted. The CN 210 creates the control messages 300, 301-1, 301-2, 302-1, 302-2 for the FNs 200, 200-1-200-8 such that they are recursively included in a top-level control message (root control message) 300a which is highest in hierarchy 600 (step X1). This recursively including resembles a respective hierarchy 600. The root control message 300a has the same data structure and format as any other control message 300, 301-1, 301-2, 302-1, 302-2. Here the CN 210 may determine dependencies between the FNs 200, 200-1-200-8, e.g., when the commands 310 implement a new forwarding path 400-2 (cf. FIG. 4). Further, the CN 210 may include request indicators in all or some or none of the control messages 300, 301-1, 301-2, 302-1, 302-2. Depending on the policies, only those FNs 200, 200-1-200-8 will reply to receiving of a control message 300, 301-1, 301-2, 302-1, 302-2 by sending a result message which have a request indicator included in their respective control message 300, 301-1, 301-2, 302-1, 302-2. Policies are conceivable where all or none FNs 200, 200-1-200-8 reply independently of any request indicators.

In step X2, the root control message 300a is sent to the FN 200-6. The FN 200-6 executes the at least one command 310 included in the root control message 300a (step X3). After said executing, the FN 200-6 send two control messages 300, 301-1, 301-2, 302-1, 302-2 to the FNs 200-2, 200-3, respectively (steps X4, X5); these two control messages 300, 301-1, 301-2, 302-1, 302-2 can be referred to as sub control messages 300, 301-1, 301-2, 302-1, 302-2 of the root control message 300a and they are obtained from a partitioning action performed, e.g., by the processor 206 of the FN 200-6.

In response to receiving the control message 300, 301-1, 301-2, 302-1, 302-2 in step X4, the FN 200-2 sends a sub control message 300, 301-1, 301-2, 302-1, 302-2 to a further FN (not shown in FIG. 7). Once respective resources are available, the FN 200-2 executes the command 310 included in this received control message 300, 301-1, 301-2, 302-1, 302-2 (step X8); in the scenario of FIG. 7, these resources are only available after sending of the control message 300, 301-1, 301-2, 302-1, 302-2 in step X5. Only after this command has been executed, the FN 200-2 sends another sub control message 300, 301-1, 301-2, 302-1, 302-2 to yet a further FN (not shown in FIG. 7) in step X9. As can be seen, the sending of the control message 300, 301-1, 301-2, 302-1, 302-2 in step X5 may occur before or after said executing in step X8, i.e., in any temporal order. However, sending in step X9 necessarily occurs after executing in step X8. To this respect, the different control messages 300, 301-1, 301-2, 302-1, 302-2 of steps X5 and X9—which are both sub control messages 300, 301-1, 301-2, 302-1, 302-2 of the control message 300, 301-1, 301-2, 302-1, 302-2 received by the FN 200-2 in step X4—may include respective implicit or explicit indicators which indicate a required temporal order with respect to the commands 310 to be executed by the FN 200-2. For example, these indicators can be particular data field or can be implicitly encoded in the respective control message 300, 301-1, 301-2, 302-1, 302-2, e.g., by means of predefined policies and a particular data format of the control message 300, 301-1, 301-2, 302-1, 302-2, a sequence number thereof, etc.

In step X10, the FN 200-2 sends a result message to the CN 210. This may be in response to performing of any or all of steps X5, X8, X9. Various information may be included, e.g., a identification key uniquely identifying performing of step X8. The result message of step X10 may function as a positive acknowledgement in an acknowledgement scheme maintained at the CN 210.

Turning to the FN 200-3, as can be seen from FIG. 7, no command 310 is executed by the FN 200-3. This is because the control message 300, 301-1, 301-2, 302-1, 302-2 received by the FN 200-3 in step X6 does not include a command 310. But this control message 300, 301-1, 301-2, 302-1, 302-2 includes a sub control message 300, 301-1, 301-2, 302-1, 302-2 which the FN 200-3 sends to a further FN (not shown in FIG. 7); thereby, the FN 200-3 serves to establish an indirect connection between the further FN and the FN 200-6.

Figure 8:
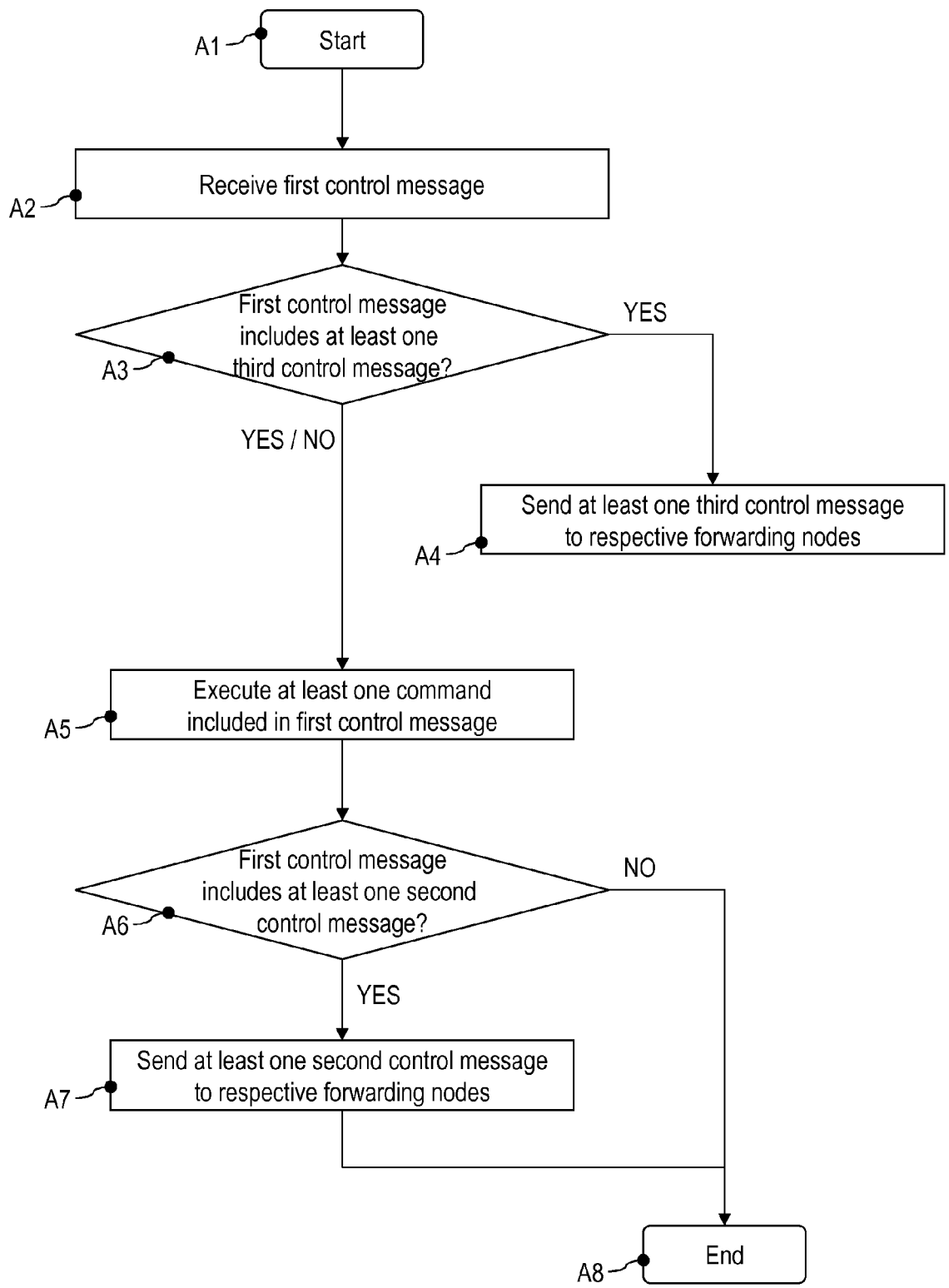
FIG. 8 is a flowchart of a method of executing commands in a plurality of forwarding nodes according to various embodiments of the present invention.

In FIG. 8, a flowchart of a method of executing a command in a FN 200, 200-1-200-8 is depicted. The method begins with step A1. In step A2, a first control message 300, 301-1, 301-2, 302-1, 302-2 is received, e.g., via one of the ports 205-1-205-4. In step A3 it is checked whether the first control message 300, 301-1, 301-2, 302-1, 302-2 includes at least one third control message 300, 301-1, 301-2, 302-1, 302-2. The third control message 300, 301-1, 301-2, 302-1, 302-2 can be implicitly or explicitly identified by respective indicators or a position in the payload of the control message 300, 301-1, 301-2, 302-1, 302-2 received in step A2. If there is a third control message, step A4 is performed where the at least one third control message 300, 301-1, 301-2, 302-1, 302-2 is sent to a respective at least one FN 200, 200-1-200-8. The respective at least one FN 200, 200-1-200-8 is identified by a respective forwarding identifier 320, e.g., indicating one of the ports 205-1-205-4. This FN 200, 200-1-200-8 is an independent FN.

After execution of step A3, in any case step A5 is performed. In step A5, at least one command 310 included in the first control message 300, 301-1, 301-2, 302-1, 302-2 as received in step A2 is executed, e.g., by the processor 206. If no command 300, 301-1, 301-2, 302-1, 302-2 is included, step A5 is skipped.

For example, if step A5 is not successful, i.e., if it is not possible to execute the at least command 310 possibly due to data errors, it is possible to skip any following steps and end the method in step A8. In particular, it is possible to not send any further sub control messages 300, 301-1, 301-2, 302-1, 302-2. Additionally or alternatively, it is possible to send a respective result message to the CN 210, e.g., as a negative acknowledgement.

In step A6 it is checked whether the first control message 300, 301-1, 301-2, 302-1, 302-2 includes a second control message 300, 301-1, 301-2, 302-1, 302-2, i.e., a sub control message 300, 301-1, 301-2, 302-1, 302-2. If not, the method ends in step A8, otherwise the second control message 200, 200-1-200-8 is sent to a respective FN 200, 200-1-200-8 being a dependent FN as indicated by the respective forwarding indicators 320 (step A7) and the method ends afterwards (step A8).

There may be a considerable delay between performing of steps A3 and A5, based on an availability of computational resources of the processor 206. For example, if there is a long queue of pending commands 310 at the respective FN 200, 200-1-200-8, step A5 may be delayed considerably. This delay does not affect step A4. Therefore, by sending control messages 300, 301-1, 301-2, 302-1, 302-2 to independent FNs 200, 200-1-200-8 in step A4, the total time needed for executing the commands 310 in the network 292 may be significantly reduced.

Figure 9:
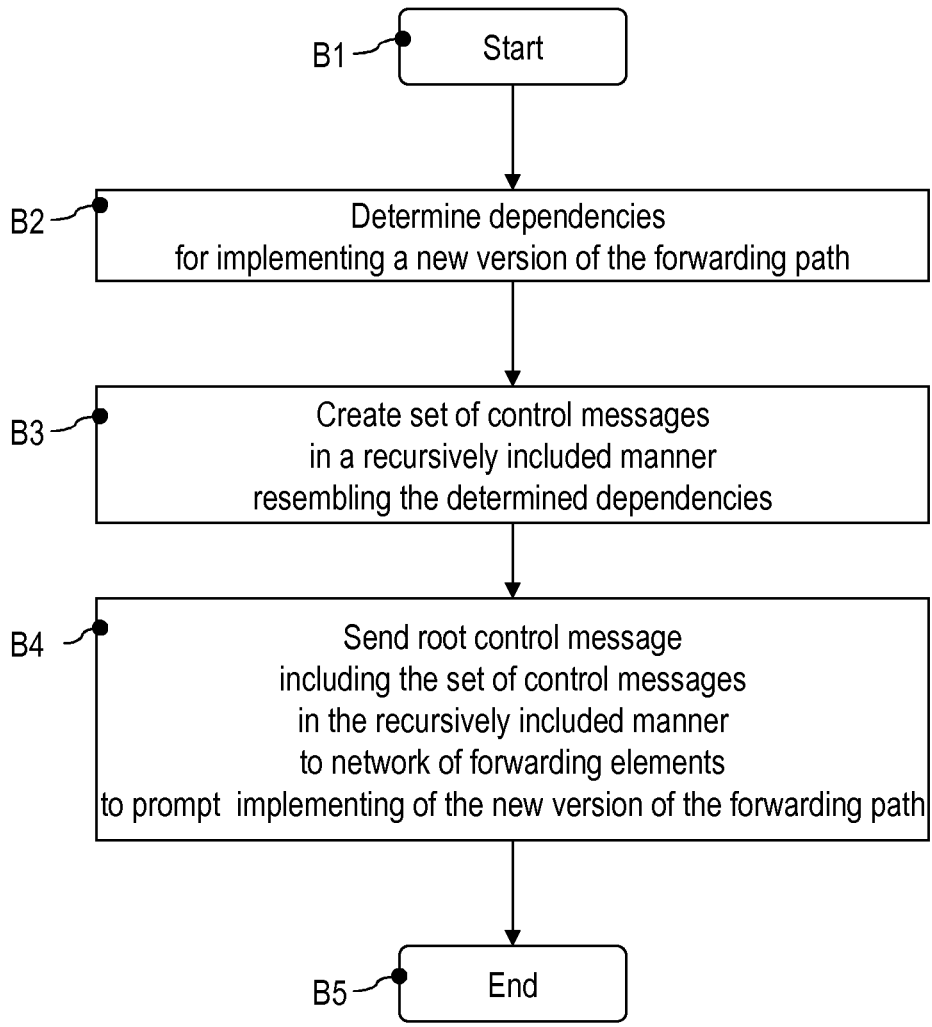
FIG. 9 is a flowchart of a method of prompting execution of commands in a plurality of forwarding nodes according to various embodiments of the present invention.

In FIG. 9, a method of prompting execution of commands 310 in the network 292 of FNs 200, 200-1-200-8 is illustrated, e.g., as may be implemented on the CN 210. The method starts in step B1. In step B2 dependencies between different FNs 200, 200-1-200-8 are determined which exist when implementing a new version of a forwarding path 400-2. The dependencies may be reflected by ordering the participating FNs 200, 200-1-200-8 in a partially ordered set. Based on the determined dependencies, in step B3 a set of control messages 300, 301-1, 301-2, 302-1, 302-2 is created for FNs 200, 200-1-200-8. These control messages 300, 301-1, 301-2, 302-1, 302-2 are recursively included in a root control message 300a. The hierarchy 600 of said recursively including is determined by the dependencies of step B2. Control messages 300, 301-1, 301-2, 302-1, 302-2 for FNs 200, 200-1-200-8 dependent on a given FN 200, 200-1-200-8 are included in control messages 300, 301-1, 301-2, 302-1, 302-2 of the given FN 200, 200-1-200-8.

The CN 210 may consider various parameters when performing step B3, e.g., the number of control messages 300, 301-1, 301-2, 302-1, 302-2, a number of branches of the hierarchy 600, an estimated time for distributing all control messages 300, 301-1, 301-2, 302-1, 302-2, a topology of the FNs 200, 200-1-200-8, etc. In general, said creating of the control messages 300, 301-1, 301-2, 302-1, 302-2 may be optimized with respect to different aspects. For example, when implementing a new version of a forwarding path 400-1, 400-2, the CN 210 can take into account the current version and the new version. Often it is possible to generate different sets of control messages 300, 301-1, 301-2, 302-1, 302-2 and, for all sets, take into account the determined dependencies thereby avoiding forwarding failures. Then selection of a particular set of control messages 300, 301-1, 301-2, 302-1, 302-2 may be dependent on such further parameters as mentioned above.

In step B4 the root control message 300a is sent to a first FN 200, 200-1-200-8 which is addressed by respective command 310 included in the root control message 300a. This prompts the implementation of the new forwarding path 400-2, e.g., by performing the steps of FIG. 8 for the respective FNs 200, 200-1-200-8.

Steps B2 and B3 are performed by the processor 216, while step B4 is performed by the interface 215. The method ends in step B5.

As is apparent from the above, techniques have been presented which enable to execute commands 310, firstly, relying on data plane distribution within the network 292 of FNs 200, 200-1-200-8 of the respective control messages 300, 301-1, 301-2, 302-1, 302-2, and, secondly, rely on recursively included control messages 300, 301-1, 301-2, 302-1, 302-2 enabling an ordered delivery of the control messages 300, 301-1, 301-2, 302-1, 302-2 along a partially ordered set of FNs, 200, 200-1-200-8.

Figure 10:
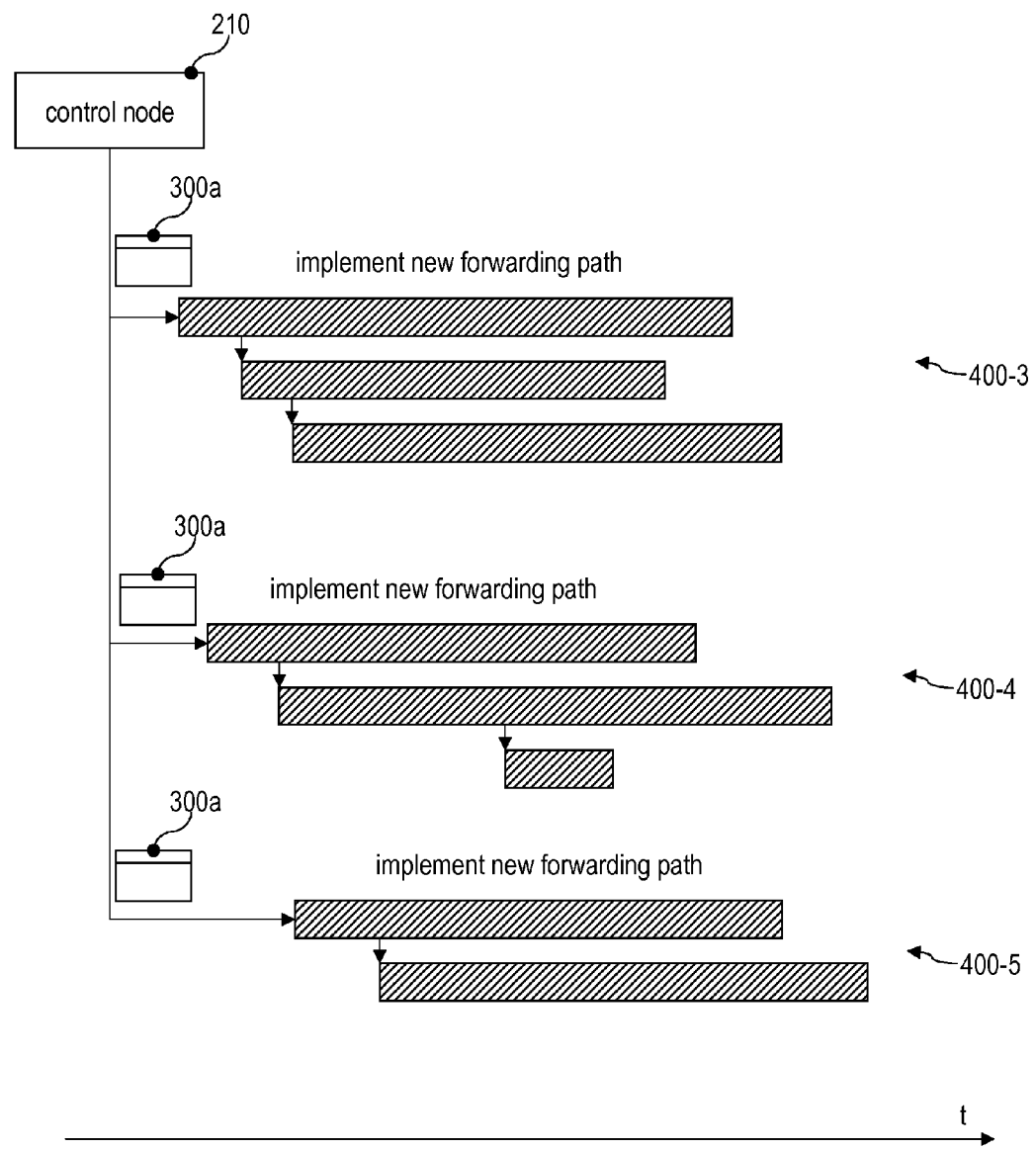
FIG. 10 illustrates parallel processing of techniques of executing commands according to various embodiments of the present invention.

While such techniques, as such, have various advantageous effects, e.g., ensuring of a sequential executing of the commands, reduced work load for the CN 210, advanced security and reliability schemes—further advantageous effects become apparent when considering the parallel performing of such techniques for a plurality of command chains or branches. This is illustrated in FIG. 10 where, as a function of time t, the implementing of new forwarding paths 400-3, 400-4, 400-5 is schematically illustrated by the dashed boxes. The forwarding paths 400-3, 400-4, 400-5 are independent from each other. Throughout the time period covered by each dashed box, commands 310 are executed in a plurality of FNs 200, 200-1-200-8.

In various reference implementations, the CN 210 would communicate with all FNs 200, 200-1-200-8 involved in such re-configuration of the forwarding paths 400-3, 400-4, 400-5 sequentially causing significant work load and data traffic or the control channel 280.

According to the techniques discussed above, it is possible to prompt execution of the respective commands 310 by sending three root control messages 300a; from this point on, the data plane, i.e., the network 292 of FNs 200, 200-1-200-8, distributes the control messages 300, 301-1, 301-2, 302-1, 302-2 largely or fully independent of the CN 210. The work load is thereby reduced and the control channel 280 data traffic is largely relieved. Unnecessary dependencies between different and inherently independent forwarding paths 400-3, 400-4, 400-5 are avoided.

By sending the three root control messages 300a, a first level of parallelization is achieved which allows for parallel executing of the respective commands leading to the re-configuring of the individual forwarding paths 400-3, 400-4, 400-5. In other words, by sending the single root control message 300a, an entire chain of executing of commands 310 can be triggered. If compared to various reference implementations, this simplifies the implementation of the CN 210 and reduces the need for frequent context-switch and/or thread-switch between the operations belonging to the different forwarding paths 400-3, 400-4, 400-5; the required computational resources may be reduced, while maintaining the same efficiency.

A second level of parallelization can be achieved if a particular control message 300, 301-1, 301-2, 302-1, 302-2 includes more than one sub control message 300, 301-1, 301-2, 302-1, 302-2 (cf. FIGS. 5A, 5B, 5C, 5D), i.e. if the hierarchy 600 branches out. Then it is possible to branch out the executing of the commands 310 for each series of commands 310. This is illustrated by the vertical arrows in FIG. 10 connecting the dashed bars. By such means of parallelization is explained above, the total time needed for executing of commands 310 may be greatly reduced if compared to a conventional scenario where the CN 210 communicates sequentially with each one of the plurality of FNs 200, 200-1-200-8; in particular a round trip time between CN 210 and FNs 200, 200-1-200-8 may be avoided if compared to reference implementations.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while reference has been predominantly made to commands implementing new forwarding rules, i.e., a new version of a forwarding path, respective techniques may be readily applied to other kinds and types of commands. Also, the respective techniques are not restricted to SDN architectures and may in general find application in any network of FNs including a network of routers.

The invention claimed is:

1. A method of executing commands in a plurality of forwarding nodes of a network of forwarding nodes, the method comprising:
   receiving, by a first forwarding node of the plurality of forwarding nodes, a first control message from a further forwarding node,
   the first control message including:
   at least one command to be executed by the first forwarding node, wherein the at least one command configures a forwarding path at the first forwarding node for a to deliver data packets along the plurality of forwarding nodes,
   a second control message for a second forwarding node of the plurality of forwarding nodes, and
   forwarding instructions to the second forwarding node to which the second control message is to be sent by the first forwarding node,
   executing, by the first forwarding node, the at least one command by to configure the forwarding path to deliver data packets from the first forwarding node along the plurality of forwarding nodes,
   configuring the second control message, to contain at least one second command to be executed by the second forwarding node, wherein the at least one second command configures a forwarding path at the second forwarding node to deliver data packets from the second forwarding node towards the first forwarding node along the plurality of forwarding nodes, and
   sending, by the first forwarding node, the second control message to the second forwarding node based on the forwarding instructions.

2. The method of claim 1,
   wherein the forwarding path connects an ingress forwarding node of the plurality of forwarding nodes with an egress forwarding node of the plurality of forwarding nodes, and
   wherein the second forwarding node is located upstream of the first forwarding node along the forwarding path in a direction towards the ingress forwarding node.

3. The method of claim 1,
   wherein said executing of the at least one command is performed before said sending of the second control message.

4. The method of claim 1,
   wherein the first control message includes a third control message for a third forwarding node of the plurality of forwarding nodes, and
   wherein said sending of the third control message to the third forwarding node is performed in any temporal order with respect to said executing of the at least one command.

5. The method of claim 1,
   wherein the second control message includes a plurality of further control messages for further forwarding nodes of the plurality of forwarding nodes, and
   wherein the further control messages are recursively included within the second control message thereby representing a sequence of forwarding of the further control messages along a partially ordered set of the plurality of forwarding nodes.

6. The method of claim 1,
   further comprising:
   decrypting and/or authenticating the received first control message employing a cryptographic key.

7. The method of claim 6,
   wherein the cryptographic key has been obtained by one of the following:
   a data security handshake of the first forwarding node with a control node configured for controlling operation of the network of forwarding nodes,
   pre-configuration, or
   a negotiation with a certificate node.

8. The method of claim 1, further comprising:
   adding, by the first forwarding node, information to second control message,
   wherein the added information is selected from the group comprising:
   an indicator indicating success or failure of said executing of the at least one command,
   an identification key uniquely identifying said executing of the at least one command on the first forwarding node, and
   data obtained in response to said executing of the command.

9. The method of claim 1,
   further comprising:
   in response to said executing of the at least one command, the first forwarding node selectively discarding the second control message based on a result of said executing of the at least one command.

10. The method of claim 1, further comprising:
    in response to said executing of the at least one command, sending, by the first forwarding node, a result message to a control node configured for controlling operation of the network of forwarding nodes,
    wherein the result message includes elements selected from the group comprising:
    an indicator indicating success or failure of said executing of the at least one command,
    a reply prompted by said executing of the at least one command,
    an identification key uniquely identifying said executing of the at least one command,
    data obtained in response to said executing of the command, and
    at least one further identification key uniquely identifying executing of at least one further command on at least one further forwarding node of the plurality of forwarding nodes.

11. The method of claim 10, further comprising
    generating the first control message to selectively include:
    request indicators which request the result message, and
    wherein said sending of the result message to the control node is selectively executed by the first forwarding node if the request indicators are included in the first control message.

12. The method of claim 1,
    in response to said sending of the second control message, the first forwarding node sending a result message to a control node configured for controlling operation of the network of forwarding nodes,
    wherein the result message includes elements selected from the group comprising:
    data obtained in response to said executing of the command, and
    at least one further identification key uniquely identifying at least one further forwarding node of the plurality of forwarding nodes executing at least one command.

13. The method of claim 1,
wherein the forwarding instructions included in the first control message are selected from the group comprising:
a port of an interface of the first forwarding node to be used for said sending of the second control message, and
indicators indicating a preset forwarding tunnel of the network of forwarding nodes.

14. The method of claim 1,
wherein the at least one command is selected from the group comprising:
a command setting forwarding properties at the first forwarding node, such as latency, priority, and/or acknowledgement scheme, and
a command invoking operational statistics of the first forwarding node.

15. A forwarding node in a network having a plurality of forwarding nodes, comprising:
an interface circuit configured for receiving a first control message from a further forwarding node,
the first control message including:
at least one command to be executed by the forwarding node, wherein the at least one command configures a forwarding path at the first forwarding node to deliver data packets along the plurality of forwarding nodes at the first forwarding node,
a second control message for a second forwarding node, and
forwarding instructions to the second forwarding node to which the second control message is to be sent by the forwarding node,
at least one processor configured for:
executing the at least one command to configure the forwarding path at the forwarding node to deliver data packets from the first forwarding node along the plurality of forwarding nodes, and
configuring the second control message to contain at least one second command to be executed by the second forwarding node, wherein the at least one second command configures a forwarding path at the second forwarding node to deliver data packets from the second forwarding node towards the first forwarding node along the plurality of forwarding nodes, and
wherein the interface circuit is further configured for sending the second control message to the second forwarding node based on the forwarding instructions.

16. A method of prompting an execution of commands in at least some of a plurality of forwarding nodes of a network of forwarding nodes, the method comprising:
a control node configured for controlling operation of the network of forwarding nodes by creating a set of control messages such that the set of control messages is recursively included within at least one root control message of the set of control messages,
any one of the set of control messages for a respective first forwarding node including at least:
a second control message of the set of control messages for a respective second forwarding node, and
forwarding instructions to the second forwarding node to which the second control message is to be sent by the respective first forwarding node,
wherein at least some of the set of control messages for the respective first forwarding node include at least one command to be executed by the respective first forwarding node, wherein the at least one command configures a forwarding path at the first forwarding node to deliver data packets from the first forwarding node along the plurality of forwarding nodes,
wherein the second control message of the set of control messages include at least one second command to be executed by the respective second forwarding node, wherein the at least one second command configures the forwarding path at the second forwarding node to deliver data packets from the second forwarding node towards the first forwarding node along the plurality of forwarding nodes,
the control node sending the at least one root control message to the first forwarding node in the network of forwarding nodes to prompt the execution of the commands.

17. The method of claim 16,
wherein said sending prompts ordered execution of the commands along a partially ordered set of the plurality of forwarding nodes, the partially order set representing said recursive including of control messages in the at least one root control message.

18. The method of claim 16,
wherein the commands implement a new version of a forwarding path for a delivery of data packets,
the new version of the forwarding path replacing a current version of the forwarding path,
wherein said creating further comprises:
determining dependencies between various forwarding nodes of the plurality of forwarding nodes, the dependencies relating to a required sequence of said implementing of the new version of the forwarding path to prevent forwarding errors.

19. The method of claim 18,
wherein the recursively including of the set of control messages reflects the determined dependencies.

20. The method of claim 18,
wherein said determining is based on elements selected from the group comprising:
a topology of the plurality of forwarding nodes;
the current version of the forwarding path; and
the new version of the forwarding path.

21. The method of claim 16, further comprising:
for a given forwarding node of the plurality of forwarding nodes located on the current version of the forwarding path, determining a subset of at least one forwarding node located on the current version of the forwarding path which requires implementing of the new version of the forwarding path subsequent to said implementing of the new version of the forwarding path on the given forwarding node,
including a respective control message for each one of the subset of at least one forwarding node in the control message for the given forwarding node.

22. The method of claim 16,
wherein said creating of the set of control messages further includes:
encrypting each control message of the set of control message based on a unique cryptographic key,
wherein the cryptographic key enables decrypting the control message at the respective first forwarding node.

23. The method of claim 16,
wherein creating further includes:
determining at least some of the set of forwarding nodes for which a result message is requested by the control node in response to the executing at least one of the commands, for which forwarding nodes the respective control message further includes request indicators which request the result message.

24. A control node configured for controlling operation in a network having a plurality of forwarding nodes, comprising:
at least one processor configured for creating a set of control messages such that the set of control messages is recursively included within at least one root control message of the set of control messages,
wherein any one of the set of control messages for a respective first forwarding node includes at least:
a second control message of the set of control messages for a respective second forwarding node, and
forwarding instructions to the respective second forwarding node to which the second control message is to be sent by the respective first forwarding node, and
wherein at least some of the set of control messages for the respective first forwarding node include at least one command to be executed by the respective first forwarding node, wherein the at least one command configures a forwarding path at the first forwarding node to deliver data packets from the first forwarding node along the plurality of forwarding,
wherein the second control message of the set of control messages include at least one second command to be executed by the respective second forwarding node, wherein the at least one second command configures the forwarding path at the second forwarding node to deliver data packets from the second forwarding node towards the first forwarding node along the plurality of forwarding nodes,
an interface configured for sending the at least one root control message to the first forwarding node in the network of the plurality of forwarding nodes to prompt execution of the commands.

25. The forwarding node of claim 15,
wherein the second control message includes a plurality of further control messages for further forwarding nodes of the plurality of forwarding nodes, and
wherein the further control messages are recursively included within the second control message thereby representing a sequence of forwarding of the further control messages along a partially ordered set of the plurality of forwarding nodes.

26. The control node of claim 24,
wherein the second control message includes a plurality of further control messages for further forwarding nodes of the plurality of forwarding nodes, and
wherein the further control messages are recursively included within the second control message thereby representing a sequence of forwarding of the further control messages along a partially ordered set of the plurality of forwarding nodes.

* * * * *